United States Patent [19]

Galasso et al.

[11] 4,416,717

[45] Nov. 22, 1983

[54] RAPID PROCESSING OF COMPOSITES

[75] Inventors: Francis S. Galasso, Manchester; Richard D. Veltri, East Hartford; Raymond L. Taylor, Durham, all of Conn.

[73] Assignee: United Technologies Corporation, Hartford, Conn.

[21] Appl. No.: 384,310

[22] Filed: Jun. 2, 1982

[51] Int. Cl.³ .............................................. B32B 31/00
[52] U.S. Cl. ................................. 156/242; 156/307.1; 156/307.3; 156/312; 156/256; 156/264
[58] Field of Search ..................... 156/62.8, 242, 256, 156/245, 264, 307.1, 307.3, 312; 264/109, 112, 113, 119, 120, 128, 134, 136; 416/229 A

[56] References Cited

U.S. PATENT DOCUMENTS

| | | | |
|---|---|---|---|
| 3,214,324 | 10/1965 | Peerman | 156/307.3 |
| 3,660,199 | 5/1972 | Riccitiello | 156/307.1 |
| 4,063,981 | 12/1977 | Rhodes et al. | 156/245 |
| 4,065,340 | 12/1977 | Dickerson | 156/307.1 |
| 4,264,671 | 4/1981 | Gillern et al. | 156/312 |

*Primary Examiner*—Caleb Weston
*Attorney, Agent, or Firm*—Charles A. Warren

[57] ABSTRACT

A spar for use in a helicopter is produced by a three step process including first a low temperature low pressure step, second a high pressure high temperature step for a short time and third a low pressure (atmospheric) medium temperature step for a relatively long time.

5 Claims, No Drawings

RAPID PROCESSING OF COMPOSITES

DESCRIPTION

1. Technical Field

A technique for reducing the time required for hot pressing a composite where the pressures and temperatures involved necessitate the use of large high pressure hot processing equipment.

2. Background Art

In producing carbon/epoxy rotor spars for helicopters the process has required a six hour cycle of hot pressing at high temperatures and pressures in order to produce a suitable part with the required strength properties. The result is that only a limited number of spars can be produced per day in each hot pressing machine. If this time could be reduced without loss of the desired properties more parts could be produced per day without the need for additional equipment.

DISCLOSURE OF THE INVENTION

A feature of the invention is a process by which the hot pressing time is minimized thereby making it possible to produce more parts per day with the same machinery.

Another feature is a process in which the composite is cured to a point where it retains its dimension without the need for the hot pressing equipment and is then hot pressed for a relatively short time to assure the desired properties in the product.

According to the invention the composite tape is cut and the several sheets of the tape are stacked as a composite in a die having open ends for the escape of the resin forced out during the processing. The composite is first processed at preform pressure and low temperature to remove the volatiles and to stabilize the resin. The composite is next hot pressed for a short time, for example one hour, at a high temperature for example 300° and at a high pressure, for example 500 psi to produce a finished spar that has the required properties. To improve its high temperature properties the composite can be given a post cure for several hours at a relatively high temperature but at atmospheric pressure. In this post cure no high pressure chamber is needed so that the procedure can be completed without extensive use of the high temperature/high pressure equipment.

The foregoing and other objects, features and advantages of the present invention will become more apparent in the light of the following detailed description of the preferred embodiments thereof.

BEST MODE FOR CARRYING OUT THE INVENTION

The invention relates to composite articles such as a spar for use in the tail rotor of a helicopter where particular strength characteristics and also flexural strength and short beam shear properties are required. To accomplish this the current project which starts with an epoxy matrix composite tape is cut to the length and width desired and the several sheets of tape are stacked in the die for treatment. One type of composite tape used is known as Hercules (34%) resin graphite prepreg tape which is a tape consisting of graphite filaments in a heat curable resin base. The die is open at its ends to permit the escape of volatiles from the composite as it is heated at a relatively low pressure and temperature such as in an autoclave.

For example this composite built up of several layers of this graphite prepreg tape and placed in the die is heated to a temperature of between 165° and 180° F. and at a pressure of from 90 to 120 psi for from three to five hours. This relatively low temperature and pressure are available in standard autoclaves and such machinery is common in shops equipped for this type of work. This treatment is referred to generally as "B" staging. The preferred treatment for accomplishing this staging is 175° F. and 100 psi pressure for a time of four hours.

This time and temperature is found to be adequate to remove the volatiles and to stabilize the percent of resin remaining in the composite, or in other words to stabilize the amount of resin that flows out of the composite. This low temperature and pressure processing also stabilizes the composite to a point where it retains its dimensions during the remainder of the process.

The composite and the die are then placed in a high temperature, high pressure press where the composite may be further processed at a high temperature, for example between 300° and 350° and at a high pressure of 450 to 550 psi for a period of about one hour. After this step the dimensions of the spar composite were the same as those after the "B" staging step in the process. The preferred temperature for this high temperature is 300° F. and the preferred pressure is 500 psi and the time is preferably just one hour. This temperature, pressure and time is found to accomplish the desired results. Thus only a relatively short time is required for the high pressure machinery used in this second step.

The next or third step is to process the composite again at 300° F. but at atmospheric pressure for about six hours. After this step the completely treated composite is found to have acceptable mechanical properties both at room temperature and also at 250° test conditions. A simulated spar that was made as above described was tested both at room temperature and at 250° with the following results:

|  | Flexure Strength Ksi | Modulus 10⁶ psi | Short Beam Shear Ksi |
|---|---|---|---|
| Room Temperature | 232 | 16.6 | 16.1 |
| 250° Temperature | 102.6 | 11.6 | 9.0 |

The room temperature tests were acceptable to the established specification for the spar Sikorsky Specification SS9611 but when tested at 250° F. the composite did not retain enough of the room temperature mechanical properties so that the post cure was considered necessary.

After the composite was given the six hour post cure at atmospheric pressure and at 300° F. the test results were as follows:

|  | Flexure Strength Ksi | Modulus 10⁶ psi | Short Beam Shear Ksi |
|---|---|---|---|
| Room Temperature | 271 | 16.1 | 15.3 |
| 250° Temperature | 181 | 15.6 | 8.9 |

These mechanical properties are acceptable both at room temerature and at the 250° F. test conditions and satisfy the established specification referred.

A particular advantage of this process is the reduction in the time necessary for high temperature and high pressure treatment as this step in the process requires a high temperature high pressure press preferably with a surrounding high pressure chamber. There are few machines available that are capable of accepting an article of the dimension of a spar and the necessity for using this type of press for several hours for each article that is being produced ties the machine up and limits the number of spars that can be produced in a day.

The high pressure, high temperature processing step requires a die capable of withstanding the pressure loading at the processing temperatures and this die is thus quite heavy and necessarily expensive. To minimize the period of time that this heavy die is in use, the part being treated may be removed from the die at the completion of the second or high pressure high temperature step. Since the part is already stable at the completion of the first step, the third step may be carried out after removal from the die. As a result the heavy die is available for use at the end of the second step, thus freeing this die from the six hour time lapse of the third step.

As a further reduction in the utilized time of the heavy die, the first step may be performed in a much simpler, lighter weight die because of the lower pressures and temperatures involved. Since the composite is stable at the end of this first step the part being processed can be removed from the die used in the first step for positioning in the heavy die when such a die is available for the second step. With this arrangement, the expensive heavy die for the second step can be utilized solely for this step and many more parts can be completed each day with each die. It will be understood that since the part is dimensionally stable at the end of the first step, the parts may be stockpiled at this point in the process until the heavy, high temperature die and the machine for carrying out this step of the process are available.

From the foregoing it will be apparent that in the production of a composite part from composite tape, the process above described includes the steps of cutting the tape to size so that it may be stacked in a die for the processing and stacking the cut tapes in a die to the extent necessary for producing the part desired. There is then a first processing step in which the stack of composite tapes within the die are treated at a temperature of between 150° and 190° F. and at a pressure from 80 to 120 psi for between three and five hours, this step in the process being possible of accomplishment in a so-called low pressure press of which there are many machines readily available. The part is then given a second processing step in which the composite is subjected to a high temperature from 275° to 325° F. and a high pressure of between 450 and 550 psi for about one hour. This process is carried out in the high pressure, high temperature presses normally utilizing, as above stated, a pressure chamber in which the part being produced within the die can be enclosed during the step of the process. Such machines are necessarily large and are not readily available. The composite is then subjected to a further processing step in which the composite is held at about 300° and at atmospheric pressure for about six hours. After this treatment the completed composite part is found to have the desired strength properties to comply with the requirements established for the part. The first step is carried out in such machines as the generally available autoclaves and the third step requires no pressure chamber since the treatment is at atmospheric pressure.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. In the production of a fiber reinforced epoxy matrix composite part from composite tape the steps of:
   cutting the tape to size;
   stacking the cut tapes in the die;
   first processing the composite within the die at a temperature of from 150° to 190° F. and at a pressure from 80 to 120 psi for between three and five hours;
   then second processing the composite at a temperature of from 275° to 375° F. and a pressure of from 450 to 550 psi for about one hour; and
   then third processing the composite at about 300° F. and at atmospheric pressure for about six hours.

2. The process of producing a composite part from composite tape as in claim 1 in which the first processing step is carried out at about 180° F. and about 100 psi.

3. A process of producing a composite part from composite tape as in claim 1 in which the second processing step is carried out at a pressure of 500 psi and at 300° F. for one hour.

4. A process of producing a composite part from composite tape as in claim 1 in which the first processing step is at about 180° F. at about 100 psi and the second processing step is at about 300° F. and about 500 psi for one hour.

5. A process for producing a composite part from composite tape as in claim 1 in which the part is removed from the die before the third processing.

* * * * *